United States Patent
Leatherman

[19]

[11] Patent Number: 5,954,080
[45] Date of Patent: Sep. 21, 1999

[54] GATED PROPORTIONAL FLOW CONTROL VALVE WITH LOW FLOW CONTROL

[75] Inventor: Russel Dean Leatherman, Summerfield, N.C.

[73] Assignee: Gilbarco, Inc., Greensboro, N.C.

[21] Appl. No.: 08/602,554

[22] Filed: Feb. 20, 1996

[51] Int. Cl.[6] .................................................. F16K 31/28
[52] U.S. Cl. ...................... 137/14; 251/30.05; 251/45; 251/61.1
[58] Field of Search ............................ 251/30.01, 30.02, 251/30.05, 45, 61.1; 137/14

[56] References Cited

U.S. PATENT DOCUMENTS

| | | | |
|---|---|---|---|
| 2,222,141 | 11/1940 | Denison | 251/30.02 |
| 2,899,972 | 8/1959 | Mathews | 251/30.02 |
| 3,439,896 | 4/1969 | Worst | 251/45 |
| 3,537,475 | 11/1970 | Potinger | 251/45 |
| 3,817,488 | 6/1974 | Mack | 251/30 |
| 3,957,244 | 5/1976 | Chauvigne | 251/45 |
| 4,058,287 | 11/1977 | Fromfield | 251/46 |
| 4,503,887 | 3/1985 | Johnson et al. | 137/624.13 |
| 5,042,775 | 8/1991 | Willemsen | 251/30.02 |
| 5,716,038 | 2/1998 | Scarffe | 251/30.03 |

FOREIGN PATENT DOCUMENTS

| | | |
|---|---|---|
| 0 343 288 | 11/1989 | European Pat. Off. . |
| 2 155 549 | 5/1973 | France . |
| 46-6954 | 2/1971 | Japan ..................................... 251/61.1 |
| 1010378 | 4/1983 | U.S.S.R. . |
| 1106947 | 8/1984 | U.S.S.R. . |
| 1439913 | 6/1976 | United Kingdom . |

Primary Examiner—A. Michael Chambers
Attorney, Agent, or Firm—Kenyon & Kenyon

[57] ABSTRACT

A gated proportional control valve is disclosed which allows both high-flow proportional dispensing and precision low flow. The design includes one or more controlled diameter and controlled-shape orifices in the control path, which, when both of the gate valves are opened, allow for consistent low flow dispensing. The gate valves can alternatively be opened or closed to allow proportional dispensing or valve closure. The invention is particularly useful in a fuel dispensing apparatus.

26 Claims, 8 Drawing Sheets

GATED PROPORTIONAL FLOW CONTROL VALVE WITH LOW FLOW CONTROL

BACKGROUND OF THE INVENTION

1. Field of the Invention

The present invention relates to a gated proportional valve, particularly a gated diaphragm flow control valve used in dispensing fuel in a proportional blending device.

2. Description of the Related Art

Gated diaphragm proportional flow control valves are known in the art of fuel dispensing, automotive and industrial control. FIG. 1 shows a schematic representation of a prior art gated diaphragm flow control valve 1, which has been used in the above applications and particularly in a fuel dispenser with proportional blending. Valve 1 includes an inlet 2 and an outlet 3 for, respectively, receiving and discharging a flow of fluid such as fuel. Inlet 2 leads to an inlet path 4, and outlet path 5 leads to outlet 3. Inlet path 4 includes two fluid flow openings, valve inlet opening 6 and gate inlet opening 7. Gate inlet opening 7 is opened and closed by a gate inlet valve 10, which is reciprocated from opened to closed positions by a gate inlet solenoid 11. Outlet path 5 includes two fluid flow openings, valve outlet opening 8 and gate outlet opening 9. Gate outlet opening 9 is opened and closed by a gate outlet valve 12, which is reciprocated from opened to closed positions by a gate outlet solenoid 13.

Valve 1 body contains a valve opening 14 which is opened and closed by a valve stem 15. Valve stem projects into a gate volume 16, and includes a valve stem diaphragm 17, which seals against walls 18 of gate volume 16. A relief port 20 connects the portion of gate volume 16 below valve stem diaphragm 17 to a valve flow area 21.

In operation of the device of FIG. 1, pressurized fluid is supplied to inlet 2 from a pressurized fluid source. When it is desired to commence fluid flow through valve 1, signals are sent to solenoids 11 and 13 to close gate outlet valve 12 and open gate inlet valve 10, thereby allowing pressurized fluid from inlet 2 and inlet path 4 to pass into gate volume 16 through gate inlet opening 7 but not to leave gate volume 16 through gate outlet opening 9. The operation of solenoids 11 and 13 are coupled, so that when one is in an open position, the other is in a closed position. If there is a sufficient pressure difference between the fluid pressure at inlet 2 and outlet 3, pressure on valve stem diaphragm 17 will move valve stem 15 downwardly, opening valve opening 14 and allowing fluid to flow from inlet 2 to outlet 3. The degree to which valve opening 14 is opened depends upon the proportional value of the inlet pressure to the outlet pressure, such that the valve opening 14 is opened more with a higher pressure difference, and opened less with a lower pressure difference. As a result, the fluid flow through valve opening 14 is proportional to the relative difference between the inlet 2 and outlet 3 pressures.

When it is desired to stop flow through valve 1, signals are sent to solenoids 11 and 13 to simultaneously open gate outlet valve 12 and close gate inlet valve 10, thereby allowing pressurized fluid from gate volume 16 to exhaust through outlet path 5 and outlet 3, while simultaneously preventing fluid from inlet 2 and inlet path 4 from entering gate volume 16. As a result, the pressure on diaphragm 17 is relieved, thereby causing valve stem 15 to move upwardly to close valve opening 14, under the action of pressure on valve stem 15 and diaphragm 17—through relief port 20—from outlet 3. This position of solenoids 11 and 13 prevents fluid from flowing from inlet 2 to outlet 3.

The above-described prior art device operates adequately to provide proportional flow control when there is a sufficiently large difference in the inlet and outlet pressures for the valve 1. However, when it is desired to operate the valve 1 at low flow rates—for example, when a fuel dispenser dispenses a preset volume or dollar amount of fuel and must dispense fuel at a low flow rate as it reaches the preset amount, or when the dispensing nozzle is variably closed or only partially open—the above-described valve can have a tendency to either not open at all or to "flutter" between opened and closed positions in an unstable manner. Accordingly, prior art fuel dispensers which use the valve shown in FIG. 1 generally include an additional valve which controls the flow of fuel at low fuel flow rates. Adding an extra valve to the fuel dispenser, however, can increase costs of the overall system. Adding the extra valve also requires extra controls for controlling the dispensing apparatus to switch between the two valves, increasing costs and adding complexity to the dispensing apparatus.

Valves of the type described above are commonly used in automotive and industrial applications to control fluid flow. As described above, the normal operation of gated diaphragm control valves is to use upstream and downstream pressure to act on a diaphragm and/or a diaphragm stem valve in order to control flow. Gated diaphragm valves are low cost because of their simple construction and are often preferred over more expensive valve technologies. Gated diaphragm valves can be used as normal on/off valves and can perform virtually all of the functions required by a proportional control valve, except reliable low flow operation. Low flow operation of a valve is normally required in precision fluid applications for dispensing exact or very precise volumes. Direct control proportional valves or stepper motor valves perform precision low flow dispensing, but are expensive. Gated diaphragm control valves are inexpensive but perform precision low flow dispensing very poorly. Gated diaphragm valves need a sufficiently large pressure differential across them to work well, and this is not available during low flow conditions.

SUMMARY OF THE INVENTION

The present invention is a modification of the traditional gated diaphragm flow control valve, to overcome the deficiency of such a valve for low flow dispensing, to provide for excellent low flow characteristics, while at the same time maintaining the typical low cost of a traditional gated diaphragm flow control valve.

The inlet and outlet paths of the present invention are modified to incorporate one or more flow restrictions, preferably in the form of control orifices. Flow restriction can also be achieved, however, by rapidly opening and closing the gate valves on a conventional gated proportional flow control valve. The use of orifices in the inlet and outlet paths allows a controlled low flow rate to exist around the main flow diaphragm through the gate volume or control chamber when the gate valves are opened. In low or controlled flow applications, the gate valves are operated with the intended purpose of to cause flow through the gate volume of the valve. By using this control flow path to bypass the main valve to create a fixed and repeatable flow rate, the valve is allowed to operate at low flow conditions that are unattainable or uncontrollable by normal flow using the main valve and the diaphragm. Using the control flow path in combination with orifices to bypass the main valve and diaphragm allows for precise low flow control in applications that require precision dispensing of fluid, such as in gasoline preset transactions. Other embodiments of the invention are disclosed, which show how different configurations of orifices and valves can optimize other aspects of valve operation, i.e. valve compliance.

DETAILED DESCRIPTION OF THE INVENTION

Figure 2:
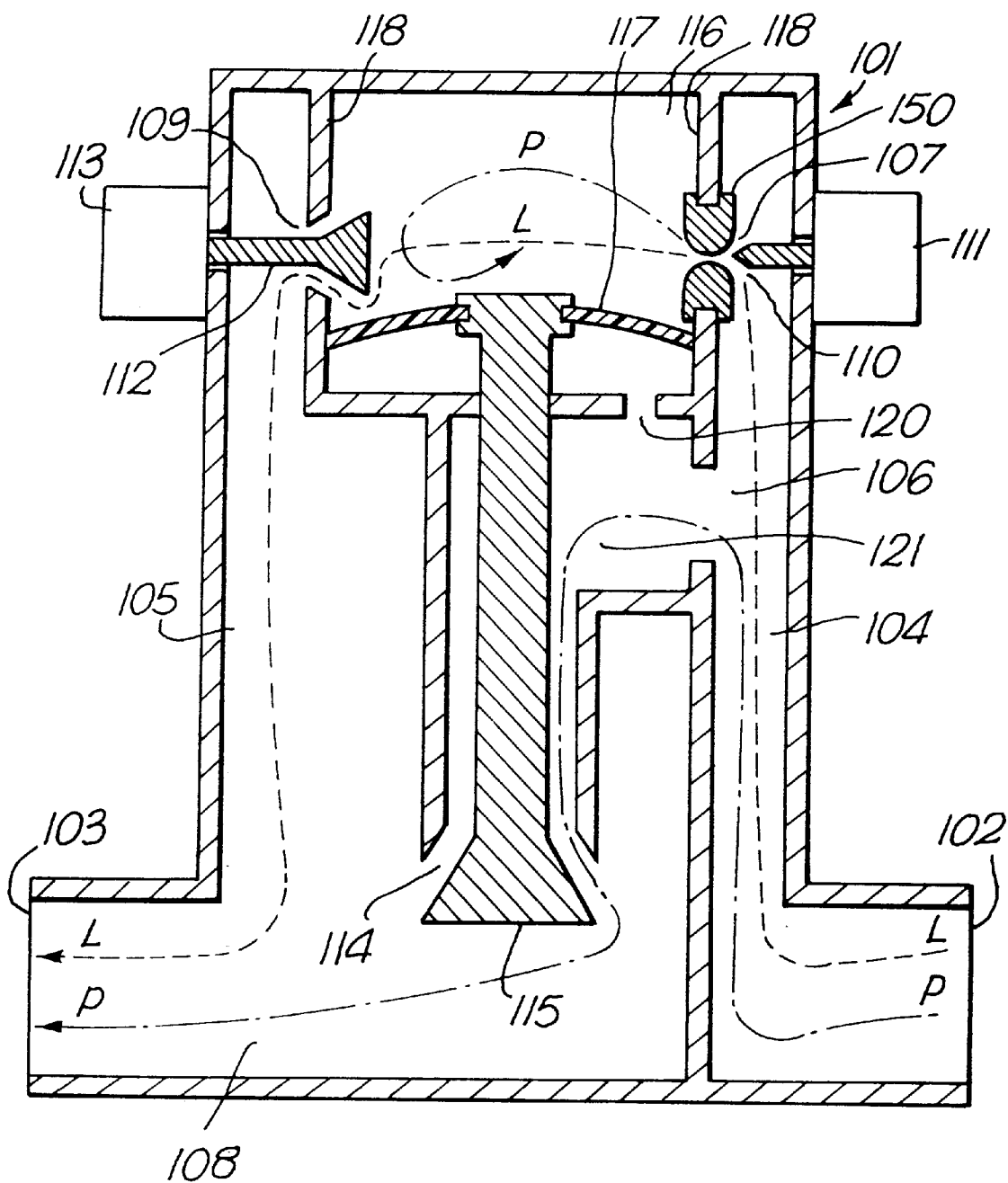
FIG. 2 is a schematic, cross-sectional view of a first embodiment of the present invention.

FIG. 2 shows a first embodiment of the present invention. Valve 101 includes an inlet 102 and an outlet 103 for, respectively, receiving and discharging a flow of fluid such as fuel. Inlet 102 leads to an inlet path 104, and outlet path 105 leads to outlet 103. Inlet path 104 includes two fluid flow openings, valve inlet opening 106 and gate inlet opening 107. Gate inlet opening 107 is opened and closed by a gate inlet valve 110, which is reciprocated from opened to closed positions by a gate inlet solenoid 111. In the embodiment of FIG. 2, gate inlet opening 107 is configured as a controlled-diameter and controlled-shape orifice in an orifice element 150. Gate inlet valve 110 is configured so as to seal against the orifice of gate inlet opening 107 in its closed position. Outlet path 105 includes two fluid flow openings, valve outlet opening 108 and gate outlet opening 109. Gate outlet opening 109 is opened and closed by a gate outlet valve 112, which is reciprocated from opened to closed positions by a gate outlet solenoid 113. Gate outlet opening 109 in the embodiment of FIG. 2 is configured as a conventional valve opening.

Valve 101 body contains a valve opening 114 which is opened and closed by a valve stem 115. Valve stem projects into a gate volume 116, and includes a valve stem diaphragm 117, which seals against walls 118 of gate volume 116. A relief port 120 connects the portion of gate volume 116 below sealing flange 117 to valve inlet opening 106.

The device of FIG. 2 operates in two modes—proportional flow and low flow. A proportional flow path of fluid is shown in dot-dash lines P. When it is desired to commence fluid flow through valve 101, signals are sent to solenoids 111 and 113 to close gate outlet valve 112 and open gate inlet valve 110, thereby allowing pressurized fluid from inlet 102 and inlet path 104 to pass into gate volume 116 but not to leave gate volume 116. If there is a sufficient pressure difference between the fluid pressure at inlet 102 and outlet 103, pressure on valve stem diaphragm 117 will overcome any upward force by the pressure at outlet 103 on the valve stem 115 and the pressure at valve opening 106 on valve stem diaphragm 117, through relief port 120, to thereby move valve stem 115 downwardly, opening valve opening 114 and allowing fluid to flow from inlet 102 to outlet 103. The degree to which valve opening 114 is opened depends upon the amount of differential pressure across the control diaphragm 117. The biasing force on the main flow (lower) side of control diaphragm 117 is equal to the area of the control diaphragm 117 exposed to the inlet pressure through relief port 120 times the inlet pressure at 106, plus the area of the valve stem 115 exposed to the outlet pressure times the outlet pressure at 108. This biasing force is the net force acting on the main flow side of diaphragm 117 and is subtracted from the main valve opening force acting on the control (upper) side of the diaphragm 117. The opening force is one of three forces, depending on the state of the gate valves 110, 112. If the inlet gate 110 is opened and the outlet gate 112 is closed, the opening force is the inlet pressure at 106 times the area of the control side of the diaphragm 117. If the inlet gate 110 is closed and the outlet gate 112 opened, the opening force is the outlet pressure at 105 times the area of the control side of the diaphragm 117. If both the inlet gate 110 and the outlet gate 112 are open, the opening force is the inlet pressure at 106, minus the pressure drop across control orifice 150, times the area of the control side of the diaphragm 117. These three forces are referred to hereinafter as the "net inlet force," "net outlet force," and "net preset force," respectively. Note also that these three forces will be generally termed "opening forces" and the net force on the opposite side of the diaphragm will be termed the "biasing forces."

The net inlet force, net outlet force or net preset force and their relation to the biasing force determine whether the valve stem 115 is open, and the amount which the valve 115 is opened. This is true whether the gates 110 and 112 are pulsed open for discreet time intervals or held completely open. In order to optimize the control characteristics of the valve 115, both the opening and closing characteristics of the valve can be modified by changing the area on the main flow side of the diaphragm 117 exposed to the inlet pressure. The limitation to such modification is the point where the net preset force is equal to the biasing force on diaphragm 117. If the net preset force is greater than the net biasing force, then the diaphragm 117 will deflect and the valve stem 115 will not remain seated during preset flow, when both the inlet gate 110 and the outlet gate 112 are open.

Whenever controlled amounts of fluid flow are allowed to enter or exhaust from the gate volume 116, the change in volume of gate volume 116 is equal to the flow rate entering through orifice 150, or exhausted through outlet 109, times the elapsed time for this flow. In this way, the change of volume in the gate volume 116 is essentially the integration (or summation) of the flow allowed to enter or leave the chamber. The increase in flow rate through valve opening 114 is proportional to the displacement stroke of valve stem 115 caused by the change in the volume of gate volume 116, resulting in the effective area of opening 114. In order to increase or decrease the effect that a change in volume into the gate volume 116 has on the change in flow through opening 114, the control area of diaphragm 117 must be decreased or increased respectively. This essentially increases or decreases the stroke by making the change of volume into gate volume 116 work over a smaller or larger area respectively, and thus increasing or decreasing the stroke of valve stem 115 respectively.

When it is desired to stop flow through valve 101 during proportional flow, signals are sent to solenoids 111 and 113 to open gate outlet valve 112 and close gate inlet valve 110, thereby allowing pressurized fluid from gate volume 116 to pass out outlet path 105 and outlet 103, but does not allow fluid from inlet 102 and inlet path 104 to enter gate volume 116. As a result, the pressure on the control side of valve stem diaphragm 117 is relieved, thereby causing valve stem 115 to move upwardly to close valve opening 114. This position of solenoids 111 and 113 prevents fluid from flowing from inlet 102 to outlet 103.

During low flow in the valve 101 of FIG. 2, signals are sent to solenoids 111 and 113 to open gate inlet and gate outlet valves 112, 113. As a result, fluid flows from inlet 102, through orifice of gate inlet opening 107, through gate volume 116, out gate outlet opening 109 and subsequently out outlet 103. Because gate inlet opening 107 is in the form of a controlled-diameter and controlled-shape orifice, the flow rate through the path described above is of a low, controlled rate. As a result, the valve can be used during preset operations to provide controlled low flow without the need for an additional valve.

The embodiment of FIG. 2 is a slow-opening/fast-closing proportional valve. Because the orifice in the embodiment of FIG. 2 is at the gate inlet, the orifice slows the flow rate into the gate volume 116 and thus slows the opening of valve 115, after gate inlet valve 110 is opened. Conversely, when gate inlet valve 110 is closed and gate outlet valve 112 is opened, the pressure of gate volume 116 is exhausted rapidly, as gate outlet 109 is not a controlled-diameter or controlled-shape orifice. As a result, the valve stem 115 closes more rapidly than it opens.

Figure 3:
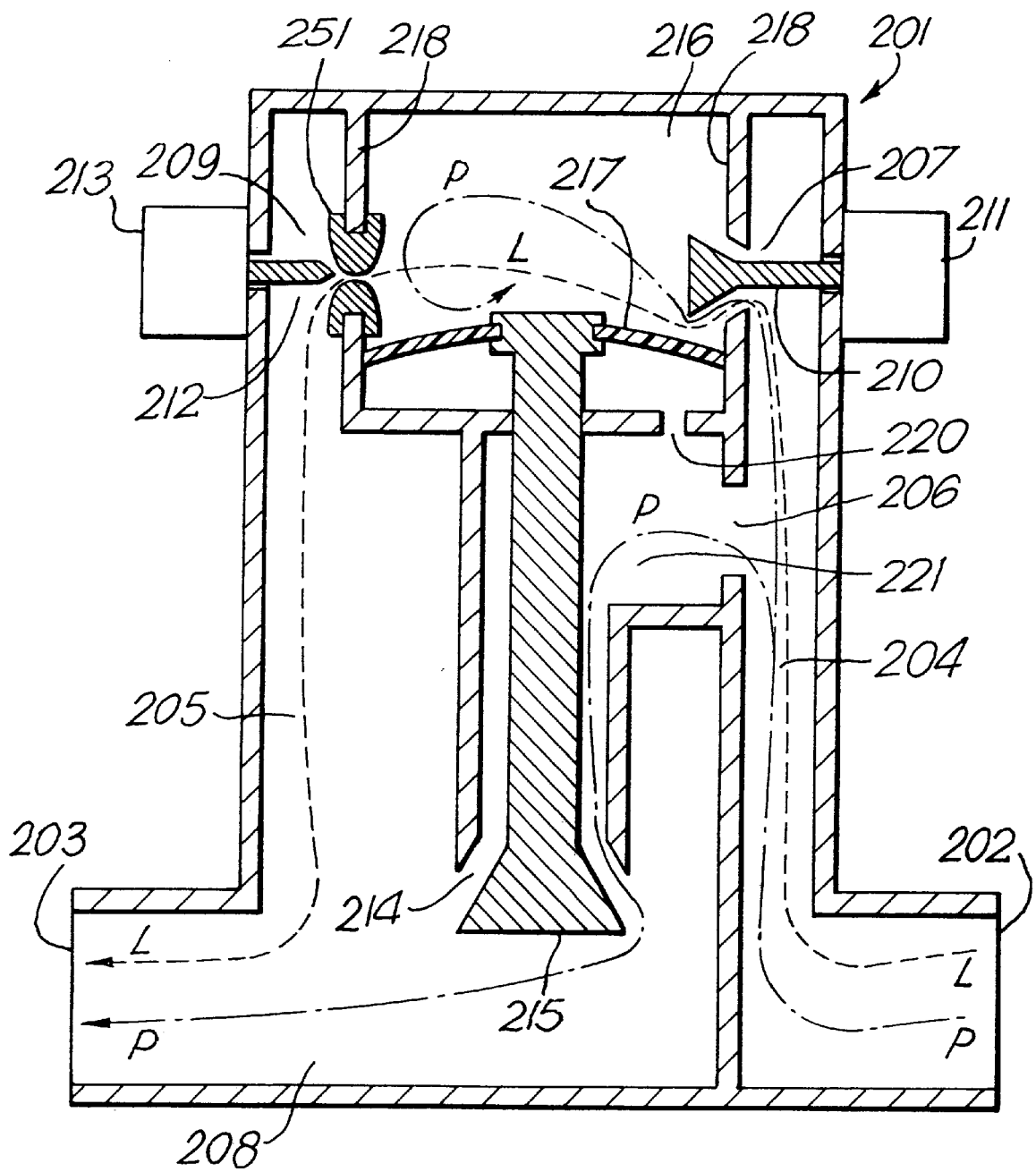
FIG. 3 is a schematic, cross-sectional view of a second embodiment of the present invention.

FIG. 3 shows a second embodiment of the present invention, which is identical in design to the embodiment of FIG. 2 except for the location of the orifice. The embodiment of FIG. 3 is a fast-opening/slow-closing proportional valve. Thus, the controlled-diameter, controlled-shape orifice element 251 is at the gate outlet 209. In operation as a low-flow valve, the embodiment of FIG. 3 is identical to the operation of the valve of FIG. 2. In proportional flow, the valve stem 215 will open more rapidly than it will close, since the orifice is located at gate outlet 209.

Figure 4:
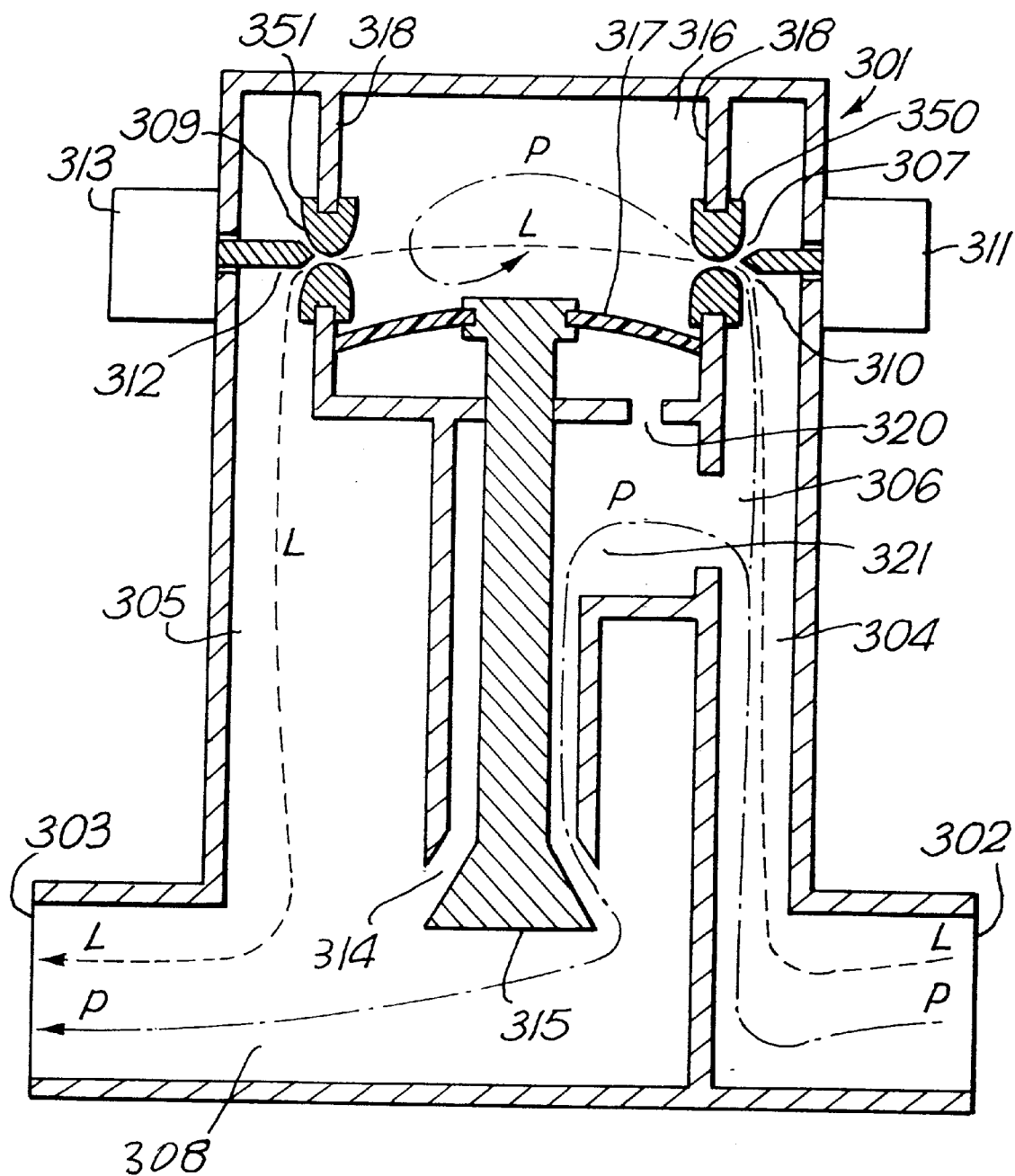
FIG. 4 is a schematic, cross-sectional view of a third embodiment of the present invention.

FIG. 4 shows a third embodiment of the present invention, which is identical in design to the embodiments of FIGS. 2 and 3 except for the location of the orifice. The embodiment of FIG. 4 is an equal-opening and -closing proportional valve. Thus, there are controlled-diameter, controlled-shape orifice elements 350, 351 at both the gate inlet 307 and gate outlet 309. As a result—because the orifices allow approximately equal flow rates because of their equal sizes and shapes—the proportional valve will open and close at the same rate. During low flow, the valve operates in a manner identical to that in the embodiments of FIGS. 2 and 3.

Figure 1:
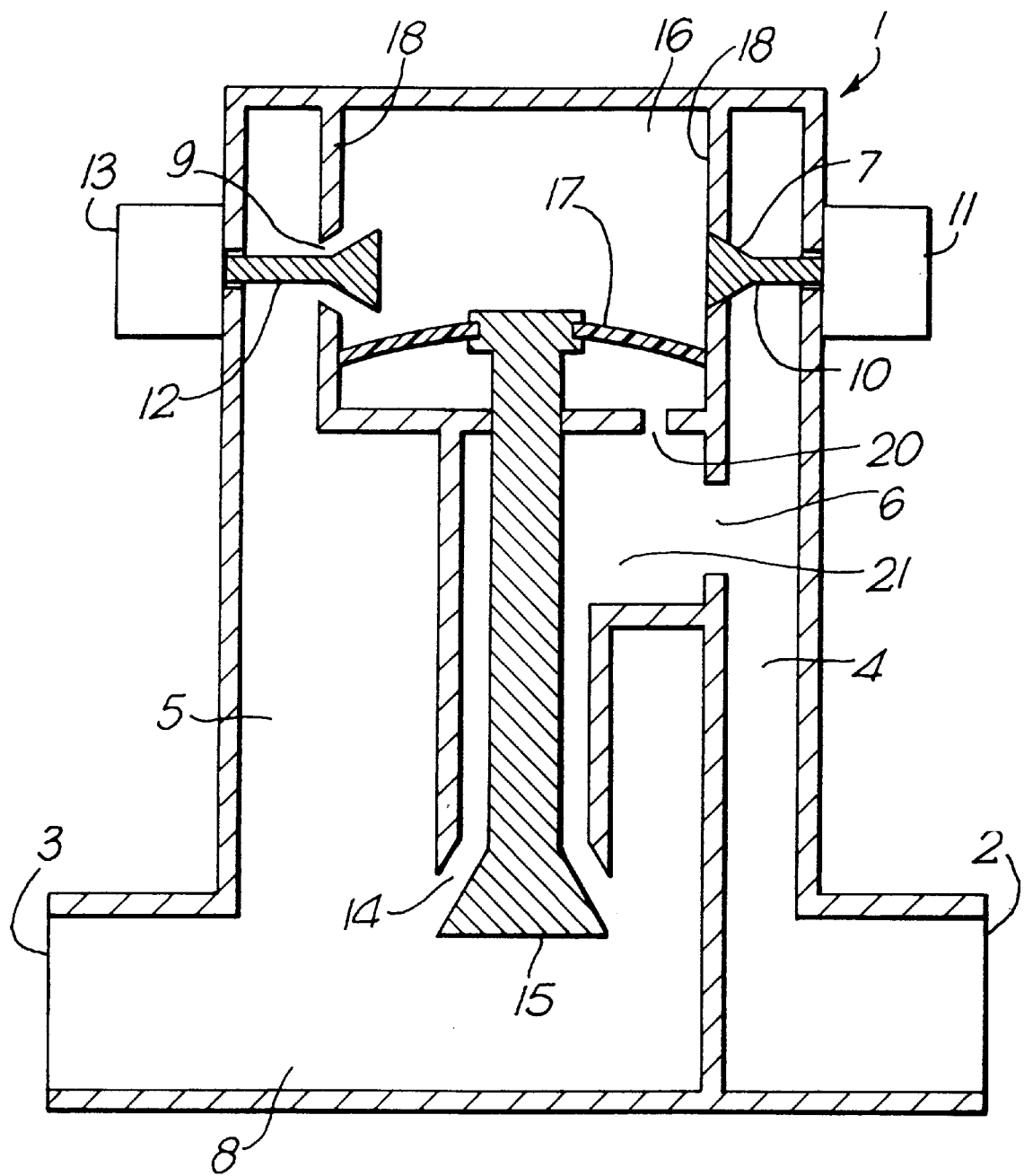
FIG. 1 is a schematic, cross-sectional view of a prior art gated proportional valve.

Although FIGS. 2–4 show the use of sized orifices 107, 209, 307, 309 to control flow rate through the gate volumes 116, 216, 316, the same effect could be achieved using a conventional valve structure (like that shown in FIG. 1), in which the valves 10, or 12, or 10 and 12, are rapidly pulsed open and closed by gate solenoids 11, or 13 or 11 and 13. As a result of such pulsing of the valves 10, or 12, or 10 and 12, the flow rate through the openings 7, or 9, or 7 and 9 is restricted (depending on the pulse rate), therefore providing the same effect as if there were a control orifice at the gate inlet, gate outlet or gate inlet and gate outlet. The same effect could be achieved by providing full-open and partially-open positions of the valves 10, or 12, or 10 and 12.

Figure 5:
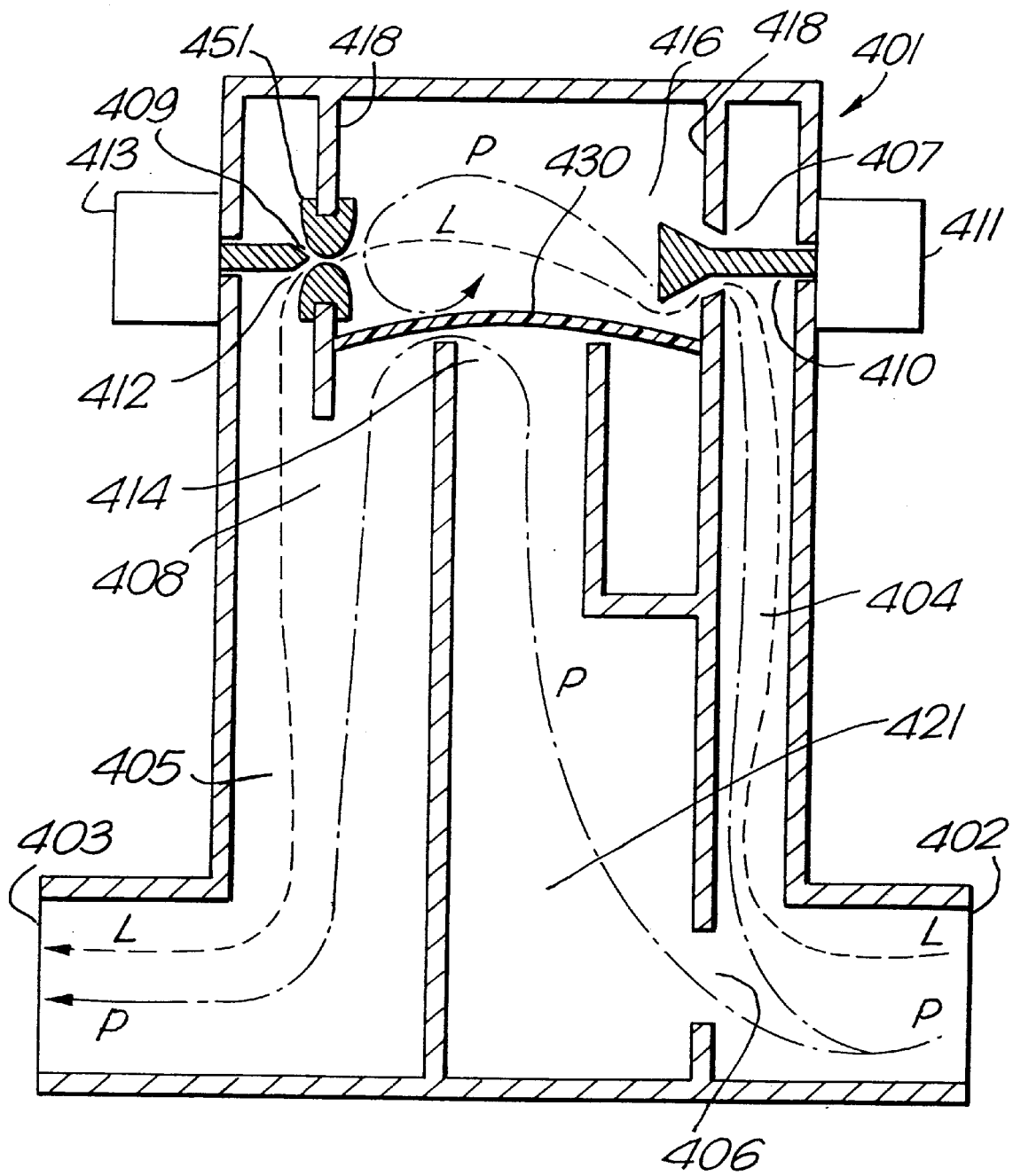
FIG. 5 is a schematic, cross-sectional view of a fourth embodiment of the present invention.
Figure 6:
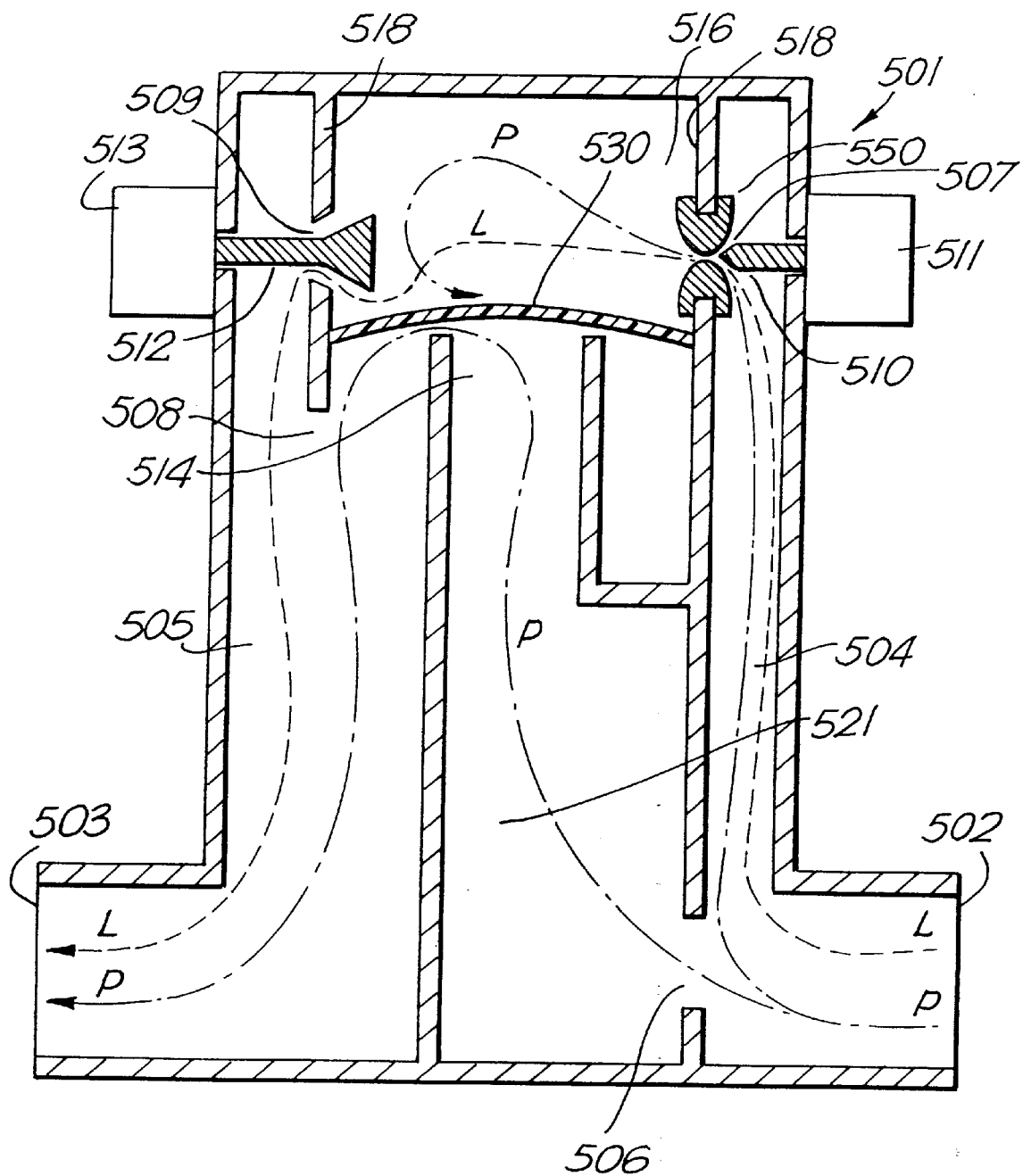
FIG. 6 is a schematic, cross-sectional view of a fifth embodiment of the present invention.
Figure 7:
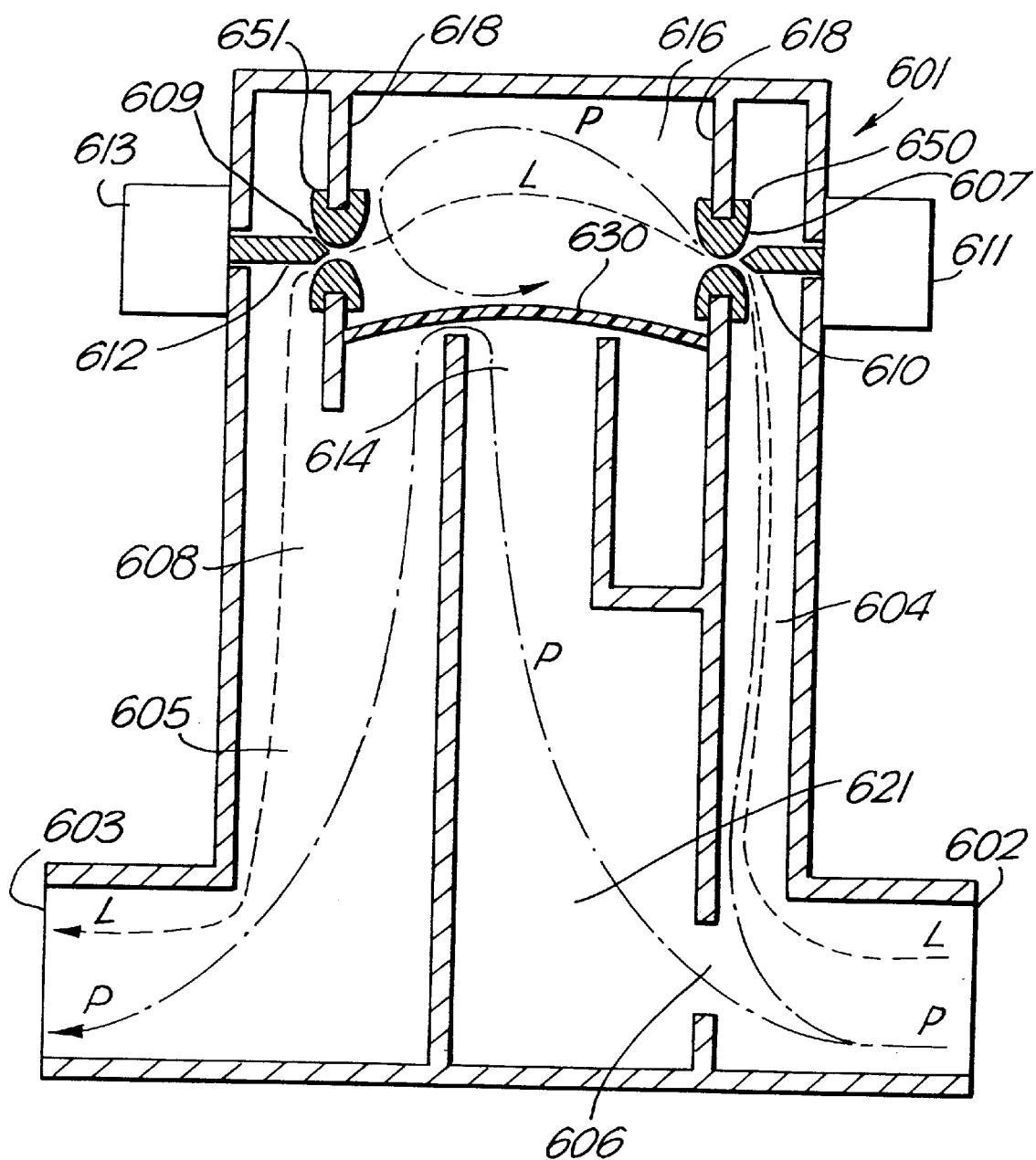
FIG. 7 is a schematic, cross-sectional view of a sixth embodiment of the present invention.

FIGS. 5–7 show fourth through sixth embodiments of the present invention which are configured in the form of a diaphragm proportional valve. In the embodiment of FIG. 5, valve 401 includes an inlet 402 and an outlet 403 for, respectively, receiving and discharging a flow of fluid such as fuel. Inlet 402 leads to an inlet path 404, and outlet path 405 leads to outlet 403. Inlet path 404 includes two fluid flow openings, valve inlet opening 406 and gate inlet opening 409. Gate inlet opening 409 in the embodiment of FIG. 5 is configured as a conventional valve opening. Gate inlet opening 407 is opened and closed by a gate inlet valve 410, which is reciprocated from opened to closed positions by a gate inlet solenoid 411. Gate inlet valve 410 is configured so as to seal against gate inlet opening 407 in its closed position. Outlet path 405 includes two fluid flow openings, valve outlet opening 408 and gate outlet opening 409. Gate outlet opening 409 is opened and closed by a gate outlet valve 412, which is reciprocated from opened to closed positions by a gate outlet solenoid 413. In the embodiment of FIG. 5, gate inlet opening 407 is configured as a controlled-diameter and controlled-shape orifice in an orifice element 451.

Valve 401 body contains a valve opening 414 which is opened and closed by a valve diaphragm 430. Valve diaphragm 430 has one side facing gate volume 416 and another side which can seal against valve opening 414.

The device of FIG. 5 operates in two modes—proportional flow and low flow. A proportional flow path of fluid is shown in dot-dash lines P. When it is desired to commence fluid flow through valve 401, signals are sent to solenoids 411 and 413 to open gate outlet valve 412 and close gate inlet valve 410, thereby venting pressurized fluid from gate volume 416 to outlet 403. If there is a sufficient pressure difference between the fluid pressure at inlet 402 and outlet 403, pressure on lower side of valve diaphragm 430 will move valve diaphragm 430 upwardly, opening valve opening 414 and allowing fluid to flow from inlet 402 to outlet 403. The degree to which valve opening 414 is opened depends upon the amount of differential pressure across the control diaphragm 430. The opening force on the main flow (lower) side of control diaphragm 117 is equal to the area of the diaphragm 117 exposed to the inlet pressure at 414 times the inlet pressure at 414, plus the area of the of the diaphragm 117 exposed to the outlet pressure at 408 times the outlet pressure at 408. This opening force is the net force acting on the main flow side of diaphragm 430 and is subtracted from the biasing force acting on the control (upper) side of the diaphragm 430. The biasing force is one of three forces, depending on the state of the gate valves 410, 412. If the inlet gate valve 410 is opened and the outlet gate valve 412 is closed, the biasing force is the inlet pressure at 406 times the area of the control side of the diaphragm 430. If the inlet gate 410 is closed and the outlet gate 412 opened, the biasing force is the outlet pressure at 405 times the area of the control side of the diaphragm 430. If both the inlet gate valve 410 and the outlet gate valve 412 are open, the biasing force is the inlet pressure at 406, minus the pressure drop across control orifice 450, times the area of the control side of the diaphragm 430. These three forces are referred to hereinafter as the "net inlet force," "net outlet force," and "net preset force," respectively. Note also that these three forces will be generally termed "biasing forces" and the net force on the opposite side of the diaphragm will be termed the "opening forces."

The net inlet force, net outlet force or net preset force and their relation to the opening force determine whether the valve opening 414 is open, and the amount which the valve opening 414 is opened. This is true whether the gates 410 and 412 are pulsed open for discreet time intervals or held completely open. In order to optimize the control characteristics of the valve 415, both the opening and closing characteristics of the valve can be modified by changing the area on the main flow side of the diaphragm 430 exposed to the inlet pressure at valve opening 414. It has been found that when the area of the valve opening 414 is equal to the area of the control side of diaphragm 430 surrounding valve opening 414, there is no need for the use of a spring to bias the diaphragm 430. The limitation to such modification is the point where the net preset force is equal to the opening force on diaphragm 430. If the net preset force is greater than the net opening force, then the diaphragm 430 will deflect and not remain seated during preset flow, when both the inlet gate 410 and the outlet gate 412 are open.

Whenever controlled amounts of fluid flow are allowed to enter or exhaust from the gate volume 416, the change in volume of gate volume 416 is equal to the flow rate entering through orifice 450, or exhausted through outlet 409, times the elapsed time for this flow. In this way, the change of volume in the gate volume 416 is essentially the integration (or summation) of the flow allowed to enter or leave the chamber. The increase in flow rate through valve opening 414 is proportional to the displacement of the diaphragm 430 caused by the change in the volume of gate volume 416, resulting in the effective area of opening 414. In order to increase or decrease the effect that a change in volume into the gate volume 416 has on the change in flow through opening 414, the control area of diaphragm 430 must be decreased or increased respectively. This essentially increases or decreases the stroke by making the change of volume into gate volume 416 work over a smaller or larger area respectively, and thus increasing or decreasing the deflection of diaphragm 430 respectively.

When it is desired to stop flow through valve 401 during proportional flow, signals are sent to solenoids 411 and 413 to close gate outlet valve 412 and open gate inlet valve 410, thereby allowing pressurized fluid from inlet 402 to enter gate volume 416 but not to exit gate volume 416. As a result, the pressure is increased on the control side of valve diaphragm 430, thereby causing valve diaphragm 431 to move downwardly to close valve opening 414. This position of solenoids 411 and 413 prevents fluid from flowing from inlet 402 to outlet 403.

During low flow in the valve 401 of FIG. 2, signals are sent to solenoids 411 and 413 to open gate inlet and gate outlet valves 412, 413. As a result, fluid flows from inlet 402, through orifice of gate inlet opening 407, through gate volume 416, out gate outlet opening 409 and subsequently out outlet 403. Because gate outlet opening 409 is in the form of a controlled-diameter and controlled-shape orifice, the flow rate through the path described above is of a low, controlled rate. As a result, the valve can be used during preset operations to provide controlled low flow without the need for an additional valve.

The embodiment of FIG. 5 is a slow-opening/fast-closing proportional valve. Because the orifice in the embodiment of FIG. 5 is at the gate outlet, it takes a period of time before the pressure of gate volume 416 is relieved after gate outlet valve 412 is opened. Conversely, when gate outlet valve 412 is closed and gate inlet valve 410 is opened, the pressure of gate volume 416 is equalized rapidly, as gate inlet 407 is not a controlled-diameter or controlled-shape orifice. As a result, the proportional valve closes more rapidly than it opens.

FIG. 6 shows a fifth embodiment of the present invention, which is identical in design to the embodiment of FIG. 5 except for the location of the orifice. The embodiment of FIG. 6 is a fast-opening/slow-closing proportional valve. Thus, the controlled-diameter, controlled-shape orifice 550 is at the gate inlet 507. In operation as a low-flow valve, the embodiment of FIG. 6 is identical to the operation of the valve of FIG. 5. In proportional flow, the valve will open more rapidly than it will close, since the orifice is located at gate inlet 507.

FIG. 7 shows a sixth embodiment of the present invention, which is identical in design to the embodiments of FIGS. 5 and 6 except for the location of the orifice. The embodiment of FIG. 7 is an equal-opening and -closing proportional valve. Thus, there are controlled-diameter, controlled-shape orifices at both the gate inlet 607 and gate outlet 609. As a result—because the orifices allow approximately equal flow rates because of their equal sizes and shapes—the proportional valve will open and close at the same rate. During low flow, the valve operates in a manner identical to that in the embodiments of FIGS. 5 and 6.

Although FIGS. 5–7 show the use of sized orifices 407, 509, 607, 609 to control flow rate through the gate volumes 416, 516, 616, the same effect could be achieved using a conventional valve structure, in which the valves are rapidly pulsed open and closed by the gate solenoids. As a result of such pulsing of the valves, the flow rate through the gate openings is restricted (depending on the pulse rate), therefore providing the same effect as if there were a control orifice at the gate inlet, gate outlet or gate inlet and gate outlet. The same effect could be achieved by providing full-open and partially-open positions of the valves 10, or 12, or 10 and 12.

Figure 8:
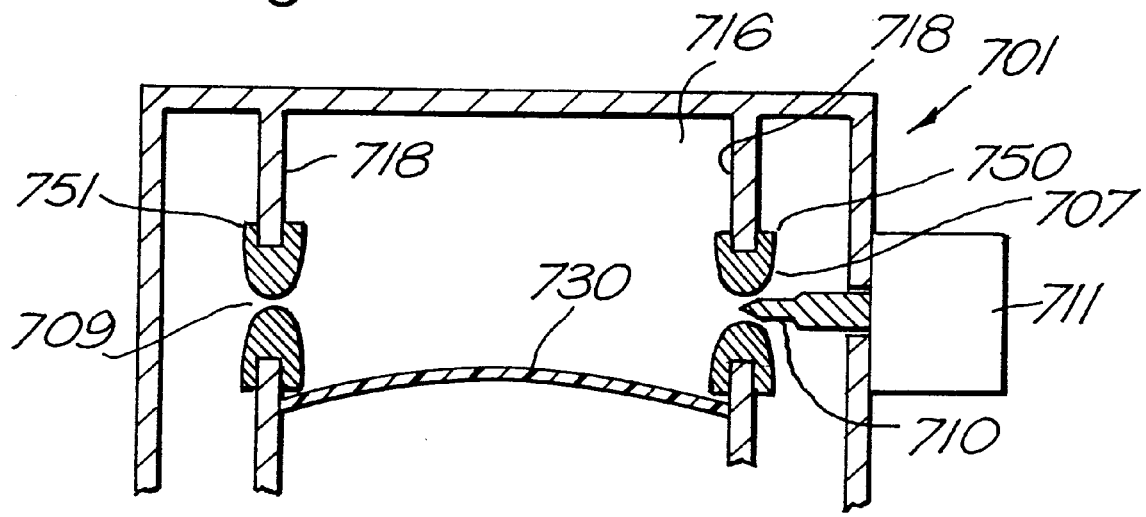
FIGS. 8 and 9 are schematic, partial, cross-sectional views of a seventh embodiment of the present invention.
Figure 9:
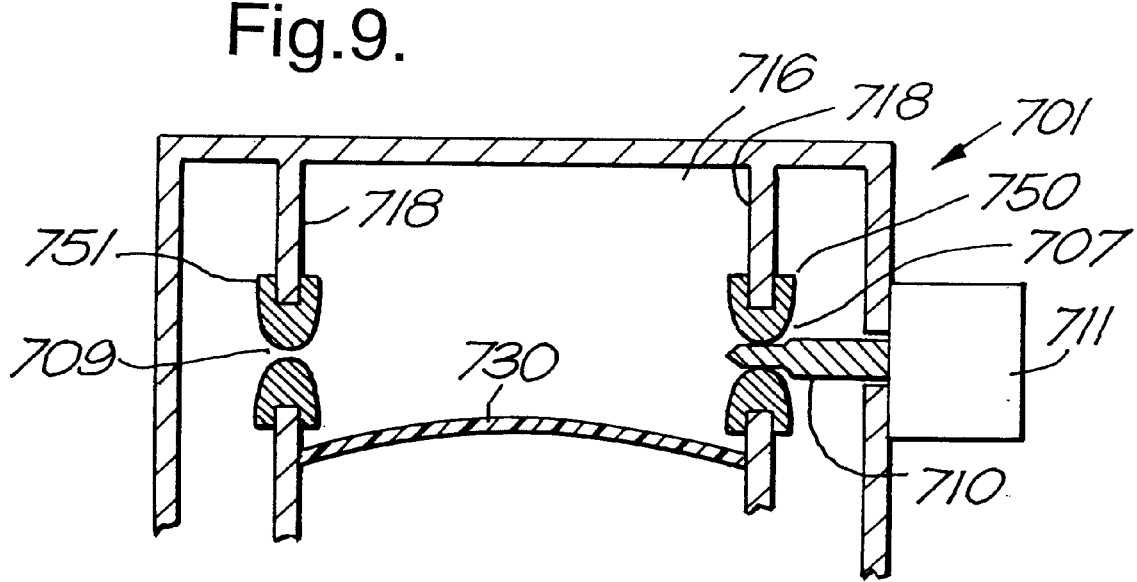

FIGS. 8 and 9 show an alternative embodiment which achieves the same results as the embodiments of FIGS. 2–4, but which requires only one solenoid 711. In the embodiment of FIGS. 8 and 9, the gate outlet opening 409 is resized to provide a small orifice which provides a controlled, very low flow rate. The gate inlet opening 407 is resized as a relatively large orifice which provides a controlled, high flow rate. Solenoid 711 is structured so as to provide three positions for the gate inlet valve 710: closed, partially-open (FIG. 9) and full-open (FIG. 8). The full-open position of gate inlet valve 710 results in a large flow rate into the gate volume 716, through gate inlet opening 707, and a small flow rate out of gate volume 716, through gate outlet opening 709. The gate volume 716 essentially integrates the difference in the inlet and exhaust flows, and the resulting net flow rate into gate volume 716 results in an accumulated pressure in gate volume 716, which pressure acts on diaphragm to effect proportional flow control (in the manner described above with reference to FIGS. 2–7). The partially-open position of gate inlet valve 710 is the low flow control position. In the partially-open position of gate inlet valve 710, the gate inlet opening 707 flow area is reduced, thereby reducing the flow rate through gate inlet opening 707 to a level approximately equal to the flow rate out gate outlet opening 709. As a result, no pressure is accumulated in gate volume 716, diaphragm 730 is thus not displaced, and no proportional flow is achieved. The flow rate through gate inlet opening 707 and gate outlet opening 709 is the resulting controlled low flow rate. In the closed position of gate inlet valve 710, any accumulated pressure in gate volume 716 is exhausted, with no net flow into gate volume 716, thereby displacing the diaphragm and shutting off both proportional flow and low flow. This embodiment produces a simplified, cost reduced version that can be controlled by modulating the input gate only. The configuration of FIGS. 8 and 9 would be used in a proportional flow control valve of the type shown in FIGS. 2–4; in the valve structure shown in FIGS. 5–7, the solenoid and valve would be located at the gate outlet, and the small orifice at the gate inlet.

It is to be understood that many variations are possible under the teachings of the present disclosure. For example, other mechanisms for providing proportional flow can be provided. In addition, the orifice need not be located at the inlet or outlet to the gate, but could be located within the gate volume. The present invention is not limited by the particular structures and methods described above, but is instead defined by the claims below.

I claim:

1. A method of providing low flow control and proportional control comprising the steps of:
   providing a valve comprising:
   a valve inlet;
   a valve outlet;
   a valve inlet opening and a gate inlet opening in fluid communication with the valve inlet;
   a valve outlet opening and a gate outlet opening in fluid communication with the valve outlet;
   a valve opening;
   a valve stem connected to a valve stem diaphragm, the valve stem closing the valve opening in a first position of the valve stem;
   a gate inlet valve, the gate inlet valve opening and closing the gate inlet opening,
   a gate outlet valve, the gate outlet valve opening and closing the gate outlet opening;
   opening the gate inlet valve and closing the gate outlet valve to thereby open the valve opening to provide fluid flow through the valve opening;
   closing the gate inlet valve and opening the gate outlet valve to thereby close the valve opening to prevent fluid flow through the valve; and
   opening the gate inlet valve and opening the gate outlet valve and thereafter pulsing at least one of the gate inlet valve or the gate outlet valve open and closed, to thereby provide low fluid flow through the valve.

2. A method of providing low flow control and proportional control comprising the steps of:
   providing a valve comprising:
   a valve inlet;
   a valve outlet;
   a valve inlet opening and a gate inlet opening in fluid communication with the valve inlet;
   a valve outlet opening and a gate outlet opening in fluid communication with the valve outlet;
   a valve opening;
   a valve diaphragm, the valve diaphragm closing the valve opening in a first position of the valve diaphragm;
   a gate inlet valve and a gate outlet valve, the gate inlet valve opening and closing the gate inlet and the gate outlet valve opening and closing the gate outlet opening;
   opening the gate inlet valve and closing the gate outlet valve to thereby close the valve opening to prevent fluid flow through the valve;
   closing the gate inlet valve and opening the gate outlet valve to thereby open the valve opening to provide fluid flow through the valve opening; and
   opening the gate inlet valve and opening the gate outlet valve and thereafter pulsing at least one of the gate inlet valve or the gate outlet valve open and closed, to thereby provide low fluid flow through the valve.

3. A method of providing low flow control and proportional control comprising the steps of:
   providing a valve comprising:
   a valve inlet;
   a valve outlet;
   a valve inlet opening and a gate inlet opening in fluid communication with the valve inlet, the gate inlet opening comprising a first orifice;
   a valve outlet opening and a gate outlet opening in fluid communication with the valve outlet, the gate outlet opening comprising a second orifice;
   a valve opening;
   a valve stem connected to a valve stem diaphragm, the valve stem closing the valve opening in a first position of the valve stem;
   a gate inlet valve, the gate inlet valve opening and closing the gate inlet, the gate inlet valve comprising a closed position, a partially opened position and a fully opened position;
   fully opening the gate inlet valve to thereby open the valve opening to provide fluid flow through the valve opening;
   closing the gate inlet valve to thereby close the valve opening to prevent fluid flow through the valve; and
   partially opening the gate inlet valve to thereby provide low fluid flow through the valve.

4. A method of providing low flow control and proportional control comprising the steps of:
   providing a valve comprising:
   a valve inlet;
   a valve outlet;
   a valve inlet opening and a gate inlet opening in fluid communication with the valve inlet, the gate inlet opening comprising a first orifice;
   a valve outlet opening and a gate outlet opening in fluid communication with the valve outlet, the gate outlet opening comprising a second orifice;
   a valve opening;
   a valve diaphragm, the valve diaphragm closing the valve opening in a first position of the valve diaphragm;
   a gate inlet valve, the gate inlet valve opening and closing the gate inlet, the gate inlet valve comprising a closed position, a partially opened position and a fully opened position;
   fully opening the gate inlet valve to thereby close the valve opening to prevent fluid flow through the valve;
   closing the gate inlet valve thereby open the valve opening to provide fluid flow through the valve opening; and
   partially opening the gate inlet valve to thereby provide low fluid flow through the valve.

5. A valve comprising:
   a valve inlet;
   a valve outlet;
   a valve element and a valve opening, the valve element opening and closing the valve opening; the valve element opening the valve opening an amount proportional to a difference between fluid pressure at the valve inlet and the valve outlet; and
   a valve gate, the valve gate comprising a gate inlet, a gate volume and a gate outlet, the valve gate further comprising at least one gate valve for opening and closing one of the gate inlet or the gate outlet, fluid pressure within the gate volume operating the valve element to thereby open and close the valve opening, the gate inlet comprising the only communication between the gate volume and the valve inlet and the gate outlet comprising the only communication between the gate volume and the valve outlet, the valve gate comprising at least one orifice, the at least one orifice providing controlled, low flow through the gate.

6. The valve of claim 5, wherein:
   the at least one gate valve comprises a gate inlet valve for opening and closing the gate inlet and a gate outlet valve for opening and closing the gate outlet.

7. The valve of claim 6, wherein:

the gate inlet and gate outlet valves are simultaneously openable to allow flow between the valve inlet and valve outlet through the at least one orifice.

8. The valve of claim 5, wherein:

the valve element comprises a valve stem connected to a valve stem diaphragm.

9. The valve of claim 5, wherein:

the valve element comprises a valve diaphragm.

10. The valve of claim 5, wherein:

the at least one orifice is located at the gate inlet.

11. The valve of claim 5, wherein:

the at least one orifice is located at the gate outlet.

12. The valve of claim 5, further comprising:

a second orifice, the at least one orifice being located at the gate inlet and the second orifice being located at the gate outlet.

13. The valve of claim 12, wherein:

the at least one gate valve is operable in a first position wherein the at least one gate valve closes the at least one orifice, the at least one gate valve is operable in a second position wherein the at least one gate valve partially opens the at least one orifice, and the at least one gate valve is operable in a third position wherein the at least one gate valve fully opens the at least one orifice.

14. The valve of claim 12, wherein:

the at least one gate valve is operable in a first position wherein the at least one gate valve closes the second orifice, the at least one gate valve is operable in a second position wherein the at least one gate valve partially opens the second orifice, and the at least one gate valve is operable in a third position wherein the at least one gate valve fully opens the second orifice.

15. A valve comprising:

a valve inlet;

a valve outlet;

a valve inlet opening and a gate inlet opening in fluid communication with the valve inlet;

a valve outlet opening and a gate outlet opening in fluid communication with the valve outlet;

a gate volume in fluid communication with only the gate outlet opening and the gate inlet opening;

a valve opening;

a valve stem connected to a valve stem diaphragm, the valve stem closing the valve opening in a first position of the valve stem;

at least one gate valve, the at least one gate valve opening and closing one of the gate inlet opening or the gate outlet opening; and an orifice which is opened and closed by the at least one gate valve.

16. The valve of claim 10, wherein:

the at least one gate valve comprises a gate inlet valve, the gate inlet valve opening and closing the gate inlet opening; and a gate outlet valve, the gate outlet valve opening and closing the gate outlet opening.

17. The valve of claim 10, wherein:

the orifice is located at the gate inlet opening.

18. The valve of claim 10, wherein:

the orifice is located at the gate outlet opening.

19. The valve of claim 15, further comprising:

a second orifice, the at least one orifice being located at the gate inlet and the second orifice being located at the gate outlet opening.

20. The valve of claim 19, wherein:

the at least one gate valve is operable in a first position wherein the at least one gate valve closes the at least one orifice, the at least one gate valve is operable in a second position wherein the at least one gate valve partially opens the at least one orifice, and the at least one gate valve is operable in a third position wherein the at least one gate valve fully opens the at least one orifice.

21. A valve comprising:

a valve inlet;

a valve outlet;

a valve inlet opening and a gate inlet opening in fluid communication with the valve inlet;

a valve outlet opening and a gate outlet opening in fluid communication with the valve outlet;

a gate volume in fluid communication with only the gate outlet opening and the gate inlet opening;

a valve opening;

a valve diaphragm, the valve diaphragm closing the valve opening in a first position of the valve diaphragm;

at least one gate valve, the at least one gate valve opening and closing one of the gate inlet opening or the gate outlet opening; and an orifice which is opened and closed by the at least one gate valve.

22. The valve of claim 21, wherein:

the at least one gate valve comprises a gate inlet valve, the gate inlet valve opening and closing the gate inlet opening; and a gate outlet valve, the gate outlet valve opening and closing the gate outlet opening.

23. The valve of claim 21, wherein:

the orifice is located at the gate inlet opening.

24. The valve of claim 21, wherein:

the orifice is located at the gate outlet opening.

25. The valve of claim 21, further comprising:

a second orifice, the orifice being located at the gate inlet and the second orifice being located at the gate outlet opening.

26. The valve of claim 25, wherein:

the at least one gate valve is operable in a first position wherein the at least one gate valve closes the second orifice, the at least one gate valve is operable in a second position wherein the at least one gate valve partially opens the second orifice, and the at least one gate valve is operable in a third position wherein the at least one gate valve fully opens the second orifice.

* * * * *